United States Patent [19]

Groves et al.

[11] 4,368,638

[45] Jan. 18, 1983

[54] TEST STAND FOR TESTING HYDRAULIC DEVICES

[75] Inventors: Richard L. Groves; Grant A. Pipho, both of Waterloo, Iowa

[73] Assignee: Deere & Company, Moline, Ill.

[21] Appl. No.: 198,881

[22] Filed: Oct. 20, 1980

[51] Int. Cl.³ .......... G01M 19/00

[52] U.S. Cl. .......... 73/168

[58] Field of Search .......... 73/168

[56] References Cited

U.S. PATENT DOCUMENTS 4,176,549 12/1979 Eichinger .......... 73/162

FOREIGN PATENT DOCUMENTS 1150853 8/1957 France .......... 73/168

230591 10/1969 U.S.S.R. .......... 73/168

*Primary Examiner*—James J. Gill

[57] ABSTRACT

A test stand for testing hydraulic devices such as hydraulic pumps and motors, either separately or jointly. The test stand is comprised of a primary power source which acts in combination with a hydraulic motor to drive a drive train, which is in turn, operated by a hydraulic pump. The hydraulic pump and the hydraulic motor are fluidly connected together by passage means so that hydraulic fluid can be pumped therebetween. A pressure control means is present in the passage means for sensing and preventing the pressure from going above a predetermined value. Connected between this pressure control means and the hydraulic motor is a control means for adjusting the fluid displacement of the hydraulic motor to correspond to the fluid output of the hydraulic pump. This control means enables the hydraulic motor to operate in synch with the hydraulic pump at all times. The test stand also has power regenerative features wherein the hydraulic motor is capable of converting the fluid pressure to mechanical power. This power is then used to drive the drive train.

11 Claims, 2 Drawing Figures

TEST STAND FOR TESTING HYDRAULIC DEVICES

BACKGROUND OF THE INVENTION

1. Field of the Invention

This invention relates to a test stand for testing hydraulic devices such as hydraulic pumps and motors and more particularly, to a test stand having power regenerative features.

2. Description of the Prior Art

Test stands for testing hydraulic devices such as hydraulic pumps and motors are used to test the operability, durability and performance of newly designed hydraulic articles. The test stands primarily incorporate a method of operating the hydraulic pumps or motors under simulated working conditions for extended periods of time. Under these simulated conditions, the displacement of the hydraulic pumps and motors are varied throughout the safe operating range for which the particular device is designed. These tests assure that the hydraulic device has been designed and built properly and will satisfy its particular need.

The simplest type of prior art test stands incorporate a drive means for driving either a hydraulic pump or motor and a meter for reading the variations of the output from the hydraulic device. More elaborate test stands incorporate the combination of hydraulic pumps and motors together with cooling and metering systems in order to assure that optimum efficiency is obtained. Some test stands even employ power regenerative features but none provide a power regenerative feature wherein the input power, minus the system's inefficiencies, is recovered using a displacement control system. This power regenerative feature is important when a large number of test items are to be tested.

Now a test stand has been invented having power regenerative features wherein a major portion of the input power can be recovered and reused in testing additional hydraulic devices.

The general object of this invention is to provide a test stand for testing hydraulic devices such as pumps and motors. A more specific object of this invention is to provide a test stand having power regenerative features using a displacement control system.

Another object of this invention is to provide a test stand which will operate with an energy saving of at least 25 percent.

Still another object of this invention is to provide a test stand for testing hydraulic devices wherein input power can be regenerated while varying the displacement of the test items.

A further object of this invention is to provide a test stand for testing hydraulic devices wherein a smaller primary power source and relatively smaller start-up equipment can be utilized.

Still, a further object of this invention is to provide a test stand for testing hydraulic devices which is more efficient to operate.

Other objects and advantages of this invention will become apparent to one skilled in the art based upon the following description and the drawings.

SUMMARY OF THE INVENTION

Briefly, the present invention relates to a test stand for testing hydraulic devices such as hydraulic pumps and motors. This test stand can test one or more hydraulic pumps and/or motors either separately or simultaneously. The test stand is comprised of a primary power source which combines with a hydraulic motor to supply input into a drive train. The drive train, in turn, operates a hydraulic pump. The hydraulic pump is fluidly connected to the hydraulic motor by passage means which is preferably formed as a closed loop. A pressure control means is located within the passage means and is used to prevent a buildup of pressure above a certain predetermined value. A control means is positioned between the pressure control means and the hydraulic motor and is capable of adjusting the fluid displacement of the hydraulic motor to correspond to the fluid output of the hydraulic pump. This control means enables the displacement of the hydraulic motor to follow that of the hydraulic pump. This feature is important especially when variable hydraulic pumps and hydraulic motors are being tested.

In addition, the hydraulic motor is capable of converting fluid pressure into mechanical energy. This mechanical energy is recovered and reused to supply a portion of the initial input power to the drive train. This power regenerative feature is possible even while varying the displacement of the test items.

DETAILED DESCRIPTION OF THE PREFERRED EMBODIMENT

Figure 1:
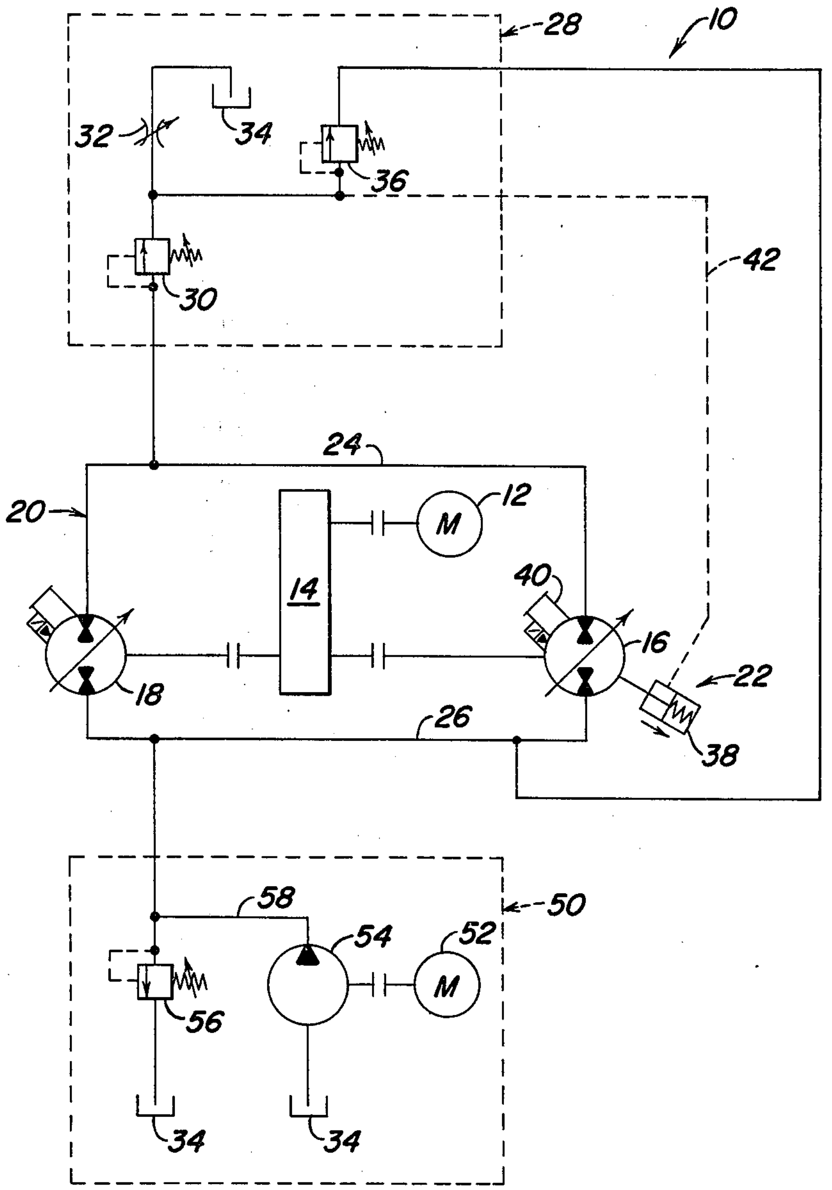
FIG. 1 is a schematic flow diagram of a test stand showing one hydraulic pump and one hydraulic motor.

Referring now to the drawings, FIG. 1 shows a test stand 10 for testing the operability, durability and/or efficiency of hydraulic devices. The test stand 10 includes a primary power source 12, a drive train 14, a hydraulic motor 16, a hydraulic pump 18, passage means 20 connecting the hydraulic pump 18 to the hydraulic motor 16 and system control means 22 for controlling the operation of the hydraulic motor 16 to correspond with the fluid displacement of the hydraulic pump 18. The primary power source 12, which is preferably an electric motor, is coupled to the drive train 14 and supplies the initial start-up power. The drive train 14 can be any conventional type of drive device such as a gear train. The hydraulic motor 16 is also coupled to the drive train 14 and has the ability of converting fluid pressure into mechanical power. This regenerated mechanical power is then used to assist in driving the drive train 14.

The hydraulic pump 18 is fluidly connected to the hydraulic motor 16 by means of the passage means 20. Preferably, the passage means 20 is formed as a closed loop wherein there is a high pressure side 24 and a low pressure side 26. Attached across the high pressure side 24 is a pressure control means 28. This pressure control means 28 serves to prevent a build-up of excessive pressure within the high pressure side 24 above a predetermined value. Such a pressure control means is essential in preventing the test stand 10 from being damaged from high pressure. The pressure control means 28 includes a relief valve 30, an orifice 32 and a first pressure control valve 36. The relief valve 30 is connected to the orifice 32 which is preferably a variable orifice. The fluid which passes through the relief valve 30 and the orifice 32 is returned to a reservoir 34. The first pressure control valve 36 is connected between the relief valve 30 and the orifice 32 and also is connected back to the low pressure side 26.

Attached between the pressure control means 28 and the hydraulic motor 16 is the system control means 22. This system control means 22 is comprised of a control mechanism 38, such as a piston or spring located within a cylinder, which is attached directly to the hydraulic motor 16. When a spring loaded piston is utilized, the piston will always be in a destroking mode when no signal is sent from the first pressure control valve 36. In other words, the displacement of the hydraulic motor 16 would increase as the spring is compressed by the outward movement of the piston in compliance with a signal received from the first pressure control valve 36. The system control means 22 also contains a composite actuator 40 which can be activated either manually or automatically. For example, the composite actuator 40 can have a solenoid, a pilot or a manual override. An electrical line 42 connects the system control means 22 to the upstream side of the first pressure control valve 36. The varying pressures sensed by the pressure control means 28 will be relayed via line 42 to the system control means 22. The control mechanism 38 will then continuously monitor and adjust the operation of the hydraulic motor 16 so that the fluid displacement of the hydraulic motor 16 will approximately correspond to the fluid displacement or output of the hydraulic pump 18. This ability of the hydraulic motor 16 to sense and track the fluid displacement of the hydraulic pump 18 is beneficial in testing hydraulic devices, especially variable displacement devices.

Connected to the low pressure side 26 of the passage means 20 is a charge means 50. The charge means 50 is comprised of a charge motor 52, a charge pump 54, and a second pressure control valve 56. The charge motor 52 drives the charge pump 54 which draws fluid, such as hydraulic oil, out of the reservoir 34 and directs it into the low pressure side 26 of the passage means 20 via line 58. The second pressure control valve 56 is connected across the line 58 and serves to prevent an excessive build-up of pressure in the low pressure side 26.

In operation, the test stand 10 is designed to test the operability of newly designed hydraulic pumps and/or motors. In testing a hydraulic pump in combination with a hydraulic motor, the test stand 10 would function as follows: The hydraulic motor 16 and the hydraulic pump 18 would be attached to the passage means 20 as indicated in FIG. 1. The primary power source 12 would then supply power to the drive train 14 which in turn would operate the hydraulic pump 18. Simultaneously, the charge pump 54 will supply fluid from the reservoir 34 to the low pressure side 26 of the passage means 20 via line 58. The fluid is then pumped by the hydraulic pump 18 at a higher pressure to the hydraulic motor 16. The hydraulic motor 16 will convert the high pressure fluid flowing in the high pressure side 24 of the passage means 20 into mechanical power. This regenerated power is then utilized to assist in driving the drive train 14. This power recovery feature is possible even when variable displacement hydraulic devices are being tested.

The test stand 10 is now on stream and a majority of the fluid will be transferred from the hydraulic pump 18 to the hydraulic motor 16 and then back to the hydraulic pump 18. A small portion of the fluid present in the passage means 20 will pass through both the relief valve 30 and the orifice 32. When the fluid flow through the relief valve 30 exceeds a predetermined value set by the restriction of the orifice 32, the excess will flow across the first pressure control valve 36. The flow through the first pressure control valve 36 will be at the predetermined pressure value. Therefore, the pressure value of the first pressure control valve 36 is sufficient to activate the control mechanism 40, via a hydraulic signal or an electrical impulse through line 42, which controls the amount of displacement of the hydraulic motor 16. The hydraulic motor 16 can either increase or decrease the fluid displacement by increasing or decreasing its stroke. The stroke is controlled to follow the change in pressure in the line 42. For example, if the displacement from the hydraulic pump 18 decreases, the pressure within the passage means 20 will decrease as will the pressure within the line 42. The control mechanism 38 will sense this decrease in pressure and cause the stroke or output of the hydraulic motor 16 to decrease. As the hydraulic motor 16 limits its stroke and displacement, the pressure within the passage means 20 will increase to the predetermined value.

Figure 2:
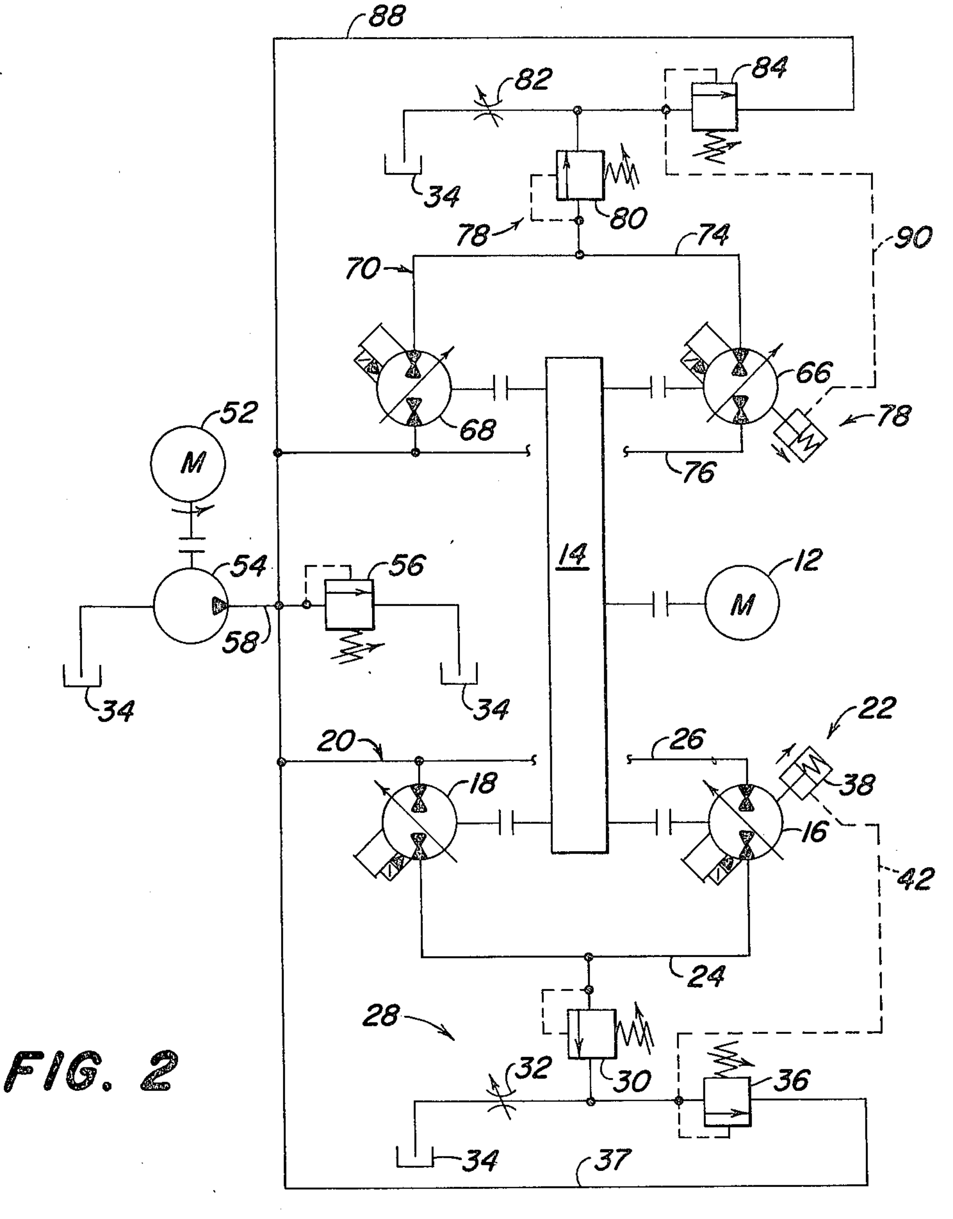
FIG. 2 is a schematic flow diagram of the test stand having a plurality of hydraulic pumps and motors attached to the drive train.

Referring to FIG. 2, a second embodiment of the test stand 10 is shown having two possible test pumps 18 and 68 and two possible test motors 16 and 66. The lower half of the test stand 10 is basically the same as FIG. 1 except for a conduit 37 which joins the first pressure control valve 36 to the second pressure control valve 56. This conduit 37 allows the fluid which would normally be returned to the resevoir 34 to be used instead to assist the charge pump 54 in maintaining system pressure.

The upper half of the test stand 10, shown in FIG. 2, is comprised of a hydraulic motor 66 connected to the drive train 14. The drive train 14 is in turn connected to the hydraulic pump 68. The hydraulic pump 68 and the hydraulic motor 66 are fluidly connected by passage means 70 having a high pressure side 74 and a low pressure side 76. Preferably, the passage means 70 is formed as a closed loop.

Attached across the high pressure side 74 is a pressure control means 78. This pressure control means 78 serves to prevent a build-up of excessive pressure within the high pressure side 74 above a predetermined value. Although the pressure control means 78 can be a single control valve, preferably it includes a relief valve 80, an orifice 82 and a third pressure control valve 84. The relief valve 80 is connected to the orifice 82 which is preferably a variable orifice. The fluid which passes through the relief valve 80 and the orifice 82 is returned to the reservoir 34. The second pressure control valve 84, which is connected between the relief valve 80 and the pressure control means 78, returns the fluid which passes through it via both conduit 88 and the second pressure control valve 56 to the reservoir 34. The fluid in the conduit 88 will also be used to assist the charge pump 54 in maintaining system pressure as does the fluid in conduit 37. This assures that sufficient fluid is always present in both of the passage means 20 and 70, respectively. The second pressure control valve 84 is also hydraulically or electrically connected to the pressure control means 78 via line 90 which serves to relay a signal as does line 42, which was discussed earlier.

In operation, the primary power source 12 will activate the drive train 14 which in turn will operate the hydraulic pumps 18 and 68. Simultaneously, the charge pump 54 will supply fluid from the reservoir 34 to the passage means 20 and 70. The fluid, once in the passage means 20 and 70, will be pumped by the hydraulic pumps 18 and 68 to the hydraulic motors 16 and 66, respectively. The power recovery feature at the hydraulic motors 16 and 66 is as explained for FIG. 1.

One of the advantages to connecting multiple pumps and motors to a single drive train is that electric motors, such as those used as the primary power source 12, are designed to operate at maximum efficiency when they are at maximum output, i.e., maximum horsepower. By hooking up multiple pumps and motors, one can design the test stand 10 so that the input demanded by the hydraulic pump 18 is minimal when the input demanded by the hydraulic pump 68 is maximum. This assures that the primary power source 12 can be operated at its maximum efficiency.

While the invention has been described in conjunction with three specific embodiments, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A test stand for testing hydraulic devices such as hydraulic pumps and motors, either separately or jointly, said test stand comprising:

(a) a primary power source;

(b) a hydraulic motor;

(c) a hydraulic pump;

(d) a drive train operatively connected to said primary power source, to said hydraulic motor and to said hydraulic pump;

(e) passage means for fluidly connecting said hydraulic pump to said hydraulic motor;

(f) pressure control means for preventing pressure build-up within said passage means above a predetermined value; and (g) system control means for adjusting fluid displacement of said hydraulic motor to correspond to fluid output of said hydraulic pump, said system control means including a control mechnanism electrically connected to said pressure control means and a composite actuator.

2. The test stand of claim 1 wherein said passage means is a charged closed loop.

3. The test stand of claim 1 wherein said pressure control means is a pressure control valve.

4. The test stand of claim 1 wherein said system control means comprises a pressure-activated control mechanism connected between said pressure control means and said hydraulic motor.

5. A test stand for testing hydraulic devices such as hydraulic pumps and motors, either separately or jointly, said test stand comprising:

(a) a primary power source;

(b) a hydraulic motor capable of converting hydraulic power into mechanical power;

(c) a hydraulic pump;

(d) a drive train operatively connected to said primary power source, to said hydraulic motor and to said hydraulic pump;

(e) passage means for fluidly connecting said hydraulic pump to said hydraulic motor in a closed loop, said passage means having a high pressure side and a low pressure side;

(f) charge means for delivering fluid to said low pressure side of said passage means;

(g) pressure control means for preventing build-up of pressure within said high pressure side of said passage means above a predetermined value; and (h) system control means for adjusting fluid displacement of said hydraulic motor to correspond to fluid output of said hydraulic pump, said system control means including a cylinder containing a spring loaded piston electrically connected to said pressure control means, said piston being in a destroking mode when no signal is received from said pressure control means.

6. The test stand of claim 5 wherein said pressure control means is a pressure control valve.

7. The test stand of claim 6 wherein said pressure control valve is a pressure relief valve.

8. The test stand of claim 5 wherein said system control means comprises a control mechanism connected between said pressure control means and said hydraulic motor.

9. The test stand of claim 8 wherein said control mechanism is a composite actuator.

10. A test stand for testing hydraulic devices, such as hydraulic pumps and motors, either separately or jointly, said test stand comprising:

(a) a primary power source;

(b) a variable displacement hydraulic motor capable of converting hydraulic power into mechanical power;

(c) a drive train drivingly connected to both said primary power source and to said variable displacement hydraulic motor;

(d) a variable displacement hydraulic pump drivingly operated by said drive train;

(e) passage means for fluidly connecting said hydraulic pump to said hydraulic motor;

(f) pressure control means for preventing build-up of pressure within said passage means above a predetermined value; and (g) system control means for adjusting fluid displacement of said hydraulic motor to correspond to fluid output of said hydraulic pump, said system control means including a composite actuator and a cylinder containing a spring loaded piston electrically connected to said pressure control means, said piston being in a destroking mode when no signal is received from said pressure control means and being in a stroking mode when a signal is received from said pressure control means.

11. A test stand for testing hydraulic pumps and motors, either separately or jointly, wherein said hydraulic pump or motor or both are the test items, said test stand comprising:

(a) a primary power source;

(b) a variable displacement hydraulic motor capable of converting hydraulic power into mechanical power;

(c) a drive train drivingly connected to both said primary power source and to said variable displacement hydraulic motor;

(d) a fixed displacement hydraulic pump drivingly operated by said drive train;

(e) passage means for fluidly connecting said hydraulic pump to said hydraulic motor in a closed loop, said passage means having a high pressure side and a low pressure side;

(f) charge means for delivering fluid to said low pressure side of said passage means;

(g) pressure control means for preventing build-up of pressure within said high pressure side of said passage means above a predetermined value; and (h) system control means for adjusting fluid displacement of said hydraulic motor to correspond to fluid output of said hydraulic pump, said system control means including a composite actuator and a cylinder containing a spring loaded piston electrically connected to said pressure control means, said piston being in a destroking mode when no signal is received from said pressure control means and being in a stroking mode when a signal is received from said pressure control means.

* * * * *